United States Patent [19]

Usami et al.

[11] Patent Number: 4,696,686
[45] Date of Patent: Sep. 29, 1987

[54] OXYGEN SEPARATING MEMBER AND PROCESS FOR PRODUCING THE SAME

[75] Inventors: Kyohei Usami, Inazawa; Katsuhiko Watanabe, Anjo, both of Japan

[73] Assignee: Nippondenso Co., Ltd., Kariya, Japan

[21] Appl. No.: 810,569

[22] Filed: Dec. 19, 1985

[30] Foreign Application Priority Data

Dec. 27, 1984 [JP] Japan ................................ 59-276715

[51] Int. Cl.$^4$ ............................................. B01D 53/22
[52] U.S. Cl. ......................................... 55/158; 427/40; 427/41; 427/255.6; 427/255.7; 428/447
[58] Field of Search ................. 55/16, 158; 427/38–41, 427/255.2, 255.6, 255.7, 407.1, 412.3, 412.5; 428/447

[56] References Cited

U.S. PATENT DOCUMENTS

| | | | |
|---|---|---|---|
| 4,239,793 | 12/1980 | Matsuura et al. | 55/158 X |
| 4,410,338 | 10/1983 | Yamamoto et al. | 55/158 |
| 4,483,901 | 11/1984 | Okita et al. | 55/158 X |
| 4,533,369 | 8/1985 | Okita | 55/158 |
| 4,581,043 | 4/1986 | van der Scheer | 55/158 X |
| 4,594,079 | 6/1986 | Yamamoto et al. | 55/158 |

FOREIGN PATENT DOCUMENTS

| | | | |
|---|---|---|---|
| 57-30528 | 2/1982 | Japan . | |
| 62302 | 4/1984 | Japan | 55/158 |
| 51505 | 3/1985 | Japan | 55/158 |
| 139316 | 7/1985 | Japan | 55/158 |

Primary Examiner—Robert Spitzer
Attorney, Agent, or Firm—Cushman, Darby & Cushman

[57] ABSTRACT

An invention relates to an oxygen separating member including a composite membrane made of a porous substrate and an organopolysiloxane film formed on the surface of the substrate. A fluorine-containing organic compound is chemically in the organopolysiloxane film. The process for producing an oxygen separating member comprising a composite membrane having an organopolysiloxane film formed on the surface of a porous substrate includes exposing the film in an inert gas plasma to produce radical active sites in the organopolysiloxane film, and then contacting it with a gaseous fluorine-containing organic compound containing a radical polymerization group to form a chemical linkage between said organopolysiloxane and fluorine-containing compound.

19 Claims, 5 Drawing Figures

FIG. I a : PERMEABILITY COEFFICIENT
b : SEPARATION FACTOR

OXYGEN SEPARATING MEMBER AND PROCESS FOR PRODUCING THE SAME

This invention relates to an oxygen separating member for selectively separating oxygen in a gaseous mixture, and a process for producing such oxygen separating member.

Oxygen-enriched air with an oxygen concentration of 30-90% finds uses for various industrial and medical purposes, such as blasting in blast furnaces, combustion assitance, petroprotein processing, waste liquor disposal, expiration in medical treatments, etc. Hitherto, such oxygen-enriched air has been obtained by first producing high-purity oxygen by a low-temperature liquefaction distillation method and then mixing air to a desired oxygen concentration. Such conventional method, however, involved some serious problems such as danger in handling of the high pressure vessle containing high-purity oxygen and necessity of a pressure adjuster for controlling the mixed gas concentration. It also had the economical problem because of the necessity of a large-scale apparatus for low-temperature liquefaction distallation.

A method is also known for producing oxygen-enriched air from atmospheric air by using a separating membrane. This method is capable of producing oxygen-enriched air directly from atmospheric air and is simple in operation and economically advantageous. For the effective utilization of such oxygen-enriched air producing techniques by use of a separating membrane in many fields of industries such as mentioned above, it is necessary to produce oxygen-enriched air in great quantities. For meeting this requirement, composite membranse have been proposed in which a thin film made of an organopolysiloxane having a high oxygen permeability coefficient is provided on a porous support. For producing such composite membranes, methods are known in which a film obtained by developing an organopolysiloxane solution on a liquid surface is applied on a porous support, or a thin film is formed by plasma polymerization directly on a porous support.

Said organopolysiloxanes have an oxygen permeability coefficient greater than $10^{-8}$ cc.cm/cm$^2$.sec.cmHg and rank highest in oxygen permeability coefficient among the presently known high polymeric substances, but at the same time they have a high nitrogen permeability coefficient and the ratio of oxygen to nitrogen permeability coefficient (separation factor) is as low as about 2. When the separation factor is about 2, the maximum oxygen concentration of the obtained oxygen-enriched air is only about 30%. This restricts the range of practical use of oxygen-enriched air.

A method is known for producing an oxygen separating membrane with a large separation factor by plasma polymerization of a fluorine-containing compound monomer. The oxygen separating membrane obtained by such method is very low in nitrogen permeability coefficient and high in separation factor, but its oxygen permeability coefficient is several ten times less than that of said organopolysiloxane membrane, so that the amount of oxygen-enriched air obtainable is limited and a membrane with an extremely large area is required for practical use.

In order to solve these problems, the present invention has for its object to provide an oxygen separating member which is capable of achieving a high separation factor while maintaining a same level of oxygen permeability as organopolysiloxanes.

For solving said technical problems the present invention employs a technical means comprising combining a fluorine-containing organic compound in the organopolysiloxane film in a composite membrane consisting of a porous substrate and an organopolysiloxane film formed on the surface of said substrate.

In accordance with this invention, a composite membrane having a thin film or an organopolysiloane with a high oxygen permeability coefficient formed on the surface of a porous support is subjected to a plasma treatment with an inert gas to produce radical active sites in the polymer chain in the organopolysiloxane film, and then a fluorine-containing compound having a radical polymerization group is reacted therewith to link the fluorine containing compound having a high oxygen separatability in the organopolysiloxane having a high oxygen permeability coefficient, whereby it is possible to greatly increase the oxygen/nitrogen separation factor without reducing the oxygen permeability coefficient of the organopolysiloxane.

EXAMPLES

The invention will be further described below in relation to the examples illustrated in the accompanying drawings.

Figure 1:
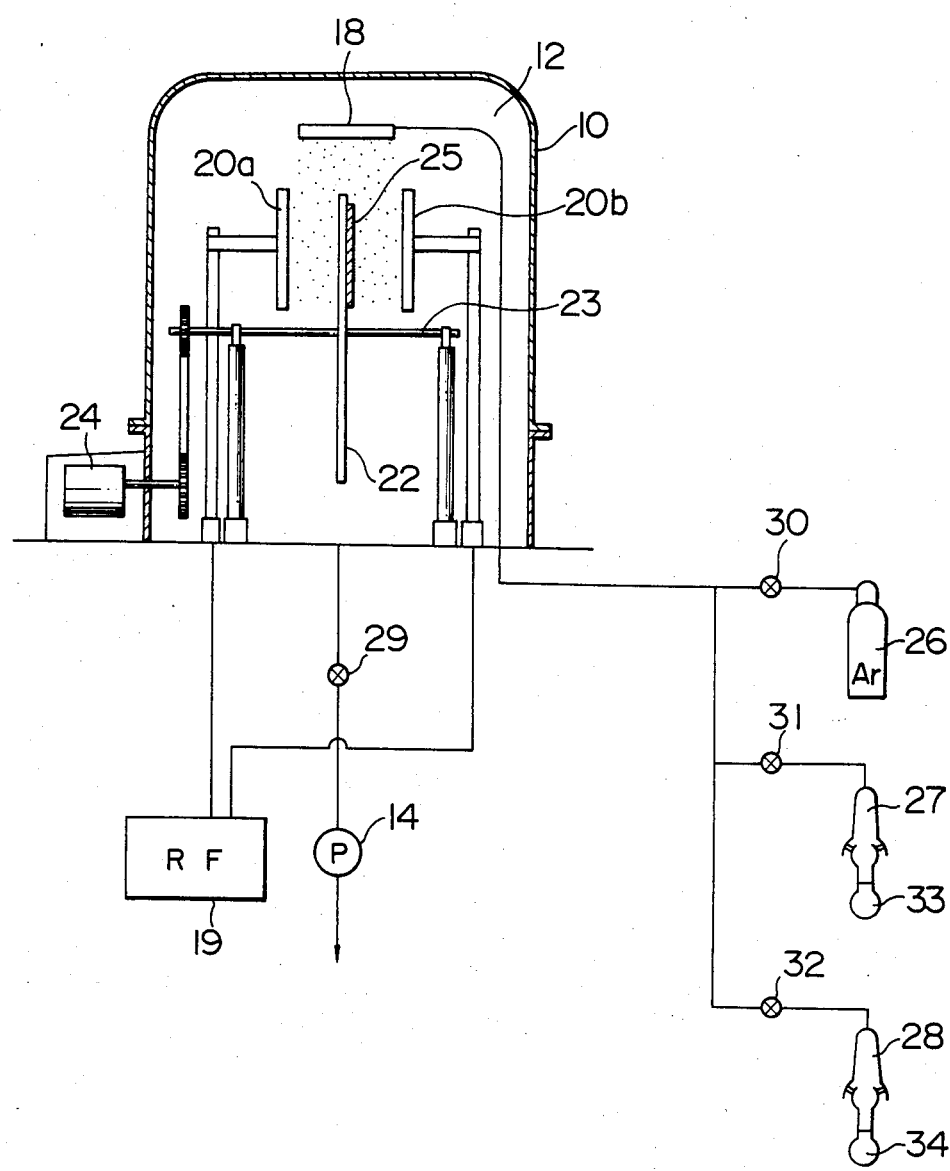
FIG. 1 is a schematic illustration of a plasma polymerization apparatus used for the practice of this invention.

FIG. 1 is a schematic illustration of a plasma polymerization apparatus used in the practice of this invention. The space 12 encompassed with a glass bell-jar 10 can be evacuated to a degree of vacuum below $10^{-2}$ Torr with a vacuum pump 14 through an on-off valve 29. The argon gas used as inert gas for the plasma treatment in this invention is stored in a cylinder 26 and supplied into the space 12 from outlet 18 by opening a valve 30. The starting monomer used for forming a thin film of organopolysiloxane 33 by a plasma polymerization reaction is stored in a container 27, and pentafluoristyrene 34 used as a fluorine-containing compound to be reacted after the inert gas plasma treatment is stored in a container 28. These materials are introduced into the space 12 from outlet is through valves 31, 32, respectively. A pair of 14 cm×14 cm electrodes 20a, 20b are disposed in opposed relation to each other in the space 12. Each electrode is incorporated with a magnet for holding plasma and connected to a low-frequency power source 19 for generating plasma. Said electrodes 20a, 20b are spaced-apart 70 mm from each other. A disc 22 is disposed substantially midway between and parallel to said two electrodes 20a, 20b. Said disc 22 is rotatable about a shaft 23 as it is driven by a drive motor 24. A porous substrate (8 cm in diameter and about 25μ in thickness) made of a porous polypropylene sheet having an average pore diameter of 0.08μ is secured to said disc 22 by a double-coated tape.

Figure 2:
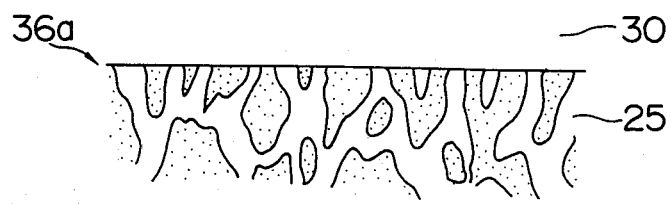
FIG. 2 is a schematic sectional view of a composite membrane in accordance with this invention.
Figure 3:
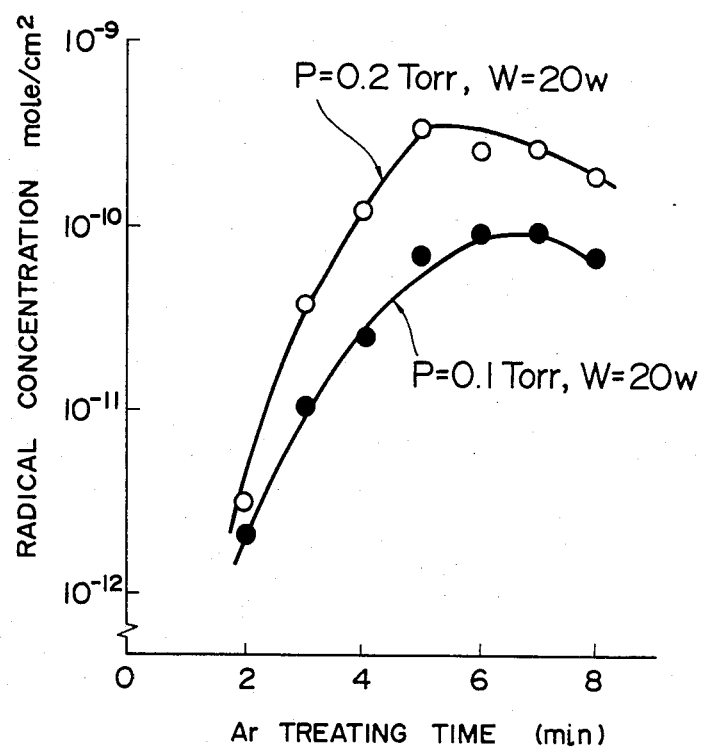
FIG. 3 is a characteristic diagram for illustrating the results of determination of radical generation by an argon plasma treatment.

The process of this invention will be described sequentially. Initially, all of the valves 29, 30, 31, 32 are closed and vacuum pump 14 is operated. Then valve 29 is opened to evacuate the space 12 in the bell-jar to a vacuumness of $10^{-2}$ Torr or below. Then valve 29 is closed and valve 30 is opened to supply argon into the space 12 until argon pressure becomes about 0.1 Torr, whereupon valve 30 is closed. A low frequency (15 KHz) current with a power of about 20 W is applied to both electrodes 20a, 20b to generate argon plasma for about 2 minutes to perfectly remove air and water remaining on the surfaces of substrate 25, disc 22 and electrodes 20a, 20b. Thereafter, low-frequency power source 19 is disconnected and valve 29 is again opened to evacuate the space 12 to $10^{-2}$ Torr or below. Then valve 31 is opened to introduce hexamethyldisiloxane stored in container 27 into space 19. Then a power of 40 W is applied between the electrodes at a frequency of 15 KHz from low-frequency power source 19 to generate plasma to initiate a plasma polymerization reaction. During this operation, the pressure of hexamethyldisiloxane 33 in the system is controlled to stay constant at 0.15 Torr by adjusting the opening of valves 29 and 31. This state is maintained for about 40 minutes while rotating disc 22 slowly, and then the polymerization is stopped. By following said process, there could be produced a composite membrane 36 having a thin film 30 of hexamethydisiloxane formed uniformly on the surface of substrate 25 by plasma polymerization as shown by an enlarged schematic sectional illustration in FIG. 2. The thickness of this menbrane, as measured from its sectional SEM image, was about 0.3μ, and the measurements of oxygen and nitrogen permeability coefficient showed that this membrane had an oxygen permeability coefficient of $1.0 \times 10^{-8}$ cc.cm/cm$^2$.sec.cmHg and a nitrogen permeability coefficient of $3.6 \times 10^{-9}$ cc.cm/cm$^2$.sec.cmHg (oxygen/nitrogen separation factor: 2.8). After said measurements, the composite membrane is again attached to disc 25, and after closing all of the valves 29, 30, 31, 32, vacuum pump 14 is operated and valve 29 is opened to evacuate the space 12 to $10^{-2}$ Torr or below. After maintaining this state for a while, valve 29 is closed and valve 30 is opened to introduce argon gas into the space 12. Then, with disc 22 being rotated, a power of 10 W is applied between the electrodes 20a, 20b at a low frequency to generate argon plasma, the argon gas pressure being maintained at 0.1 Torr by adjusting the opening of valves 29 and 30. The thus generated argon plasma is mostly composed of argon radicals, and these argon radicals impinge against the hexamethyldisiloxane plasma polymerization film 30 formed on substrate 25 to produce numerous radical active sites in the polymer chain. FIG. 3 shows the result of quantitative determination of radical generation by a radical trapper DPPH (1,1-diphenyl-2-picrylhydrazyl) under the two different conditions: argon pressure (P)=0.1 Torr, power applied (W)=20 W; and P=0.2 Torr, W=20 W. In the graph of FIG. 3, radical concentration per unit area is plotted as ordinate and argon treating time as abscissa. Determination was made in the following way. After the argon plasma treatment for a given period of time, composite membrane 36 was immersed in a $1.8 \times 10^{-4}$ mol/1 benzene solution of DPPH and heated at 70° C. for 60 minutes. Thereafter, composite membrane 36 was taken out, and the DPPH concentration in the remaining solution and the DPPH concentration in the pre-treatment solution were determined by measuring DPPH specific absorption at 520 nm, and the radical concentration was calculated from the amount of DPPH reduced by the treatment. It is seen from the graph that the maximum radical concentration is reached after an approximately 5-minute treatment.

Figure 4:
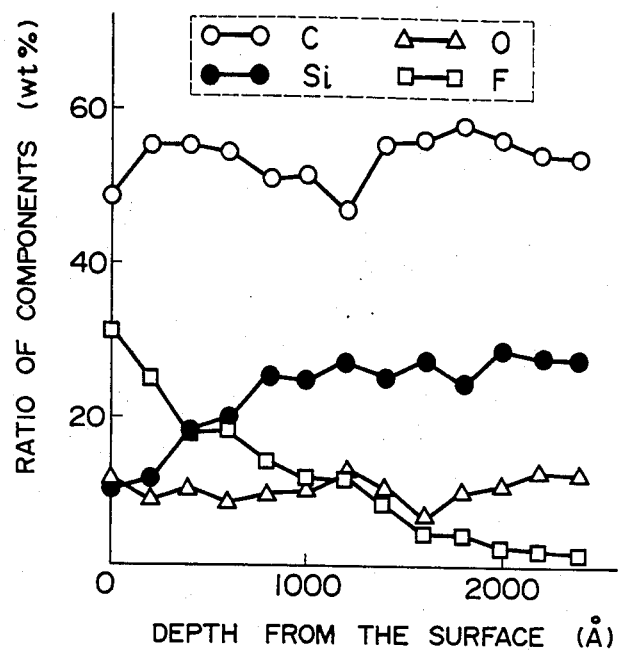
FIG. 4 is a characteristic diagram showing the results of determination of the components of a composite membrane as measured by XPS from the surface of the membrane.
Figure 5:
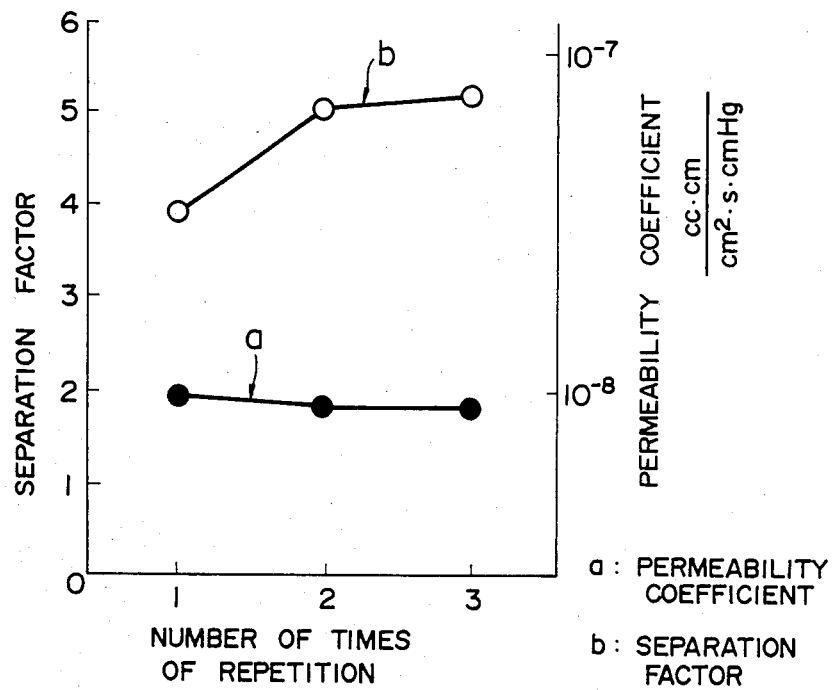
FIG. 5 is a characteristic diagram showing the relation of the number of times of repetition of the process to separation factor and oxygen permeability coefficient of the membrane when the argon plasma treatment and the pentafluorostyrene reaction were repeated.

After 5-minute treatment with argon plasma, valve 30 is closed and valve 29 is opened to quickly evacuate the space 12 to $10^{-2}$ Torr or below. Immediately thereafter, valve 32 is opened to introduce vapor of pentafluorostyrene 34 stored in container 28 into the space 12, and this state is left as it is for 24 hours. During the period, the radical active sites on the previously formed polyhexamethyldisiloxane film 30 react with the vinyl group of pentafluorostyrene to form a linkage. Elemental analysis of the thus produced composite membrane 36 from its outermost surface layer by XPS (X-ray photolectron spectrum) clarified the dispersion of fluorine atoms into the membrane as shown in the graph of FIG. 4 in which the ratio of constituent elements is plotted as ordinate and the depth from the surface as abscissa. Oxygen and nitrogen permeability coefficients of this membrane were $9.5 \times 10^{-9}$ cc.cm/cm$^2$. sec.cmHg and $2.5 \times 10^{-9}$ cc.cm/cm$^2$.sec.cmHg, respectively, and oxygen/nitrogen separation factor was 3.8. Also, by repeating the argon plasma treatment and pentafluorostyrene treatment, it was possible to effectively increase the separation factor with substantially no reduction of oxygen permeability coefficient as shown in FIG. 5 where the number of times of repetition is expressed on the horizontal axis, the separation factor on the left-hand vertical axis and the oxygen permeability coefficient on the right-hand vertical axis, and bent line a indicates permeability coefficient and b separation factor. As noted from FIG. 3, an oxygen permeability coefficient of $9.0 \times 10^{-9}$ cc.cm/cm$^2$.sec.cmHg and a separation factor of 5.3 could be achieved by three times of repetition of said process.

The present invention is not limited to the examples described above but finds wider applications. Starting monomers of organopolysiloxane compounds usable in this invention include, beside hexamethyldisiloxane mentioned above, octamethylcyclotetrasiloxane, trimethoxysilane, tetramethoxysilane, triethoxysilane and the like. Favorable examples of the fluorine-containing compounds having radical polymerization groups usable in this invention include, beside pentafluorostyrene used in the above-described examples, tetrafluoroethylene, 1,1-difluoroethylene, 1,2-difluoroethylene, 1-trifluoromethylethylene, tetrafluorodivinylbenzene and the like. Argon and helium can be employed as the gas used for the plasma treatment in this invention. As for the apparatus for carrying out the process of this invention, there can be used, beside the internal electrode system shown in FIG. 1, the known outer electrode system and electrodeless system. In the above-described examples, plasma polymerization was utilized for forming an organopolysiloxane film on a porous substrate before conducting the plasma treatment, but the film can be also formed from an organopolysiloxane solution by a known method.

As described above, the present invention has the effect of greatly improving the separation factor of an oxygen separating membrane with substantially no deterioration of the conventional organopolysiloxane film, by employing a method in which a composite membrane having an organopolysiloxane film with a high oxygen permeability coefficient formed on the surface of a porous support is first subjected to a plasma treatment with an inert gas and then a fluorine-containing compound having a polymerization group is reacted.

What is claimed is:

1. An oxygen separating member comprising:
a composite membrane consisting of a porous substrate and a single organopolysiloxane film formed on a surface of said substrate, a fluorine-containing organic compound being chemically combined in said organopolysiloxane film in a non-plasma atmosphere.

2. The oxygen separating member according to claim 1, wherein the organopolysiloxane is produced from a monomer selected from the group consisting of hexamethyldisiloxane, octamethylcyclotetrasiloxane, trimethyoxysilane, tetramethoxysilane and triethoxysilane.

3. The oxygen separating member according to claim 1, wherein the organopolysiloxane is produced from hexamethyldisiloxane.

4. The oxygen separating member according to claim 1, wherein the fluorine-containing organic compound is selected from the group consisting of pentafluorostyrene, tetrafluorethylene, 1,1-difluroethylene, 1,2-difluroethylene, 1-trifluoromethylethylene and tetrafluorodivinylbenzene.

5. The oxygen separating member according to claim 1, wherein the fluorine-containing organic compound is pentafluorostyrene.

6. The oxygen separating member according to claim 1, wherein the organopolysiloxane is produced from hexamethyldisiloxane, and the fluorine-containing organic compound is pentafluorostyrene.

7. The oxygen separating member according to claim 1, wherein the porous substrate is porous polyproplylene.

8. The oxygen separating member according to claim 1, wherein the porous substrate is porous polypropylene, and the organopolysiloxane is produced from hexamethyldisiloxane.

9. A process for producing an oxygen separating member, comprising:

providing a composite member constituted by a single organopolysiloxane film formed on a surface of a porous substrate;

exposing said film in an inert gas plasma to produce radical active sites in said organopolysiloxane film, evacuating the inert gas plasma to form a non-plasma atmosphere, and then reacting the organopolysiloxane film having the radical active sites in said non-plasma atmosphere with a gaseous fluorine containing organic compound containing a radical polymerization group to form a linkage between said organopolysiloxane and said fluorine-containing compound.

10. The process according to claim 9, wherein the organopolysiloxane is produced from a monomer selected from the group consisting of hexamethyldisiloxane, octamethylcyclotetrasiloxane, trimethoxysiloane, tetramethoxysilane and triethoxysilane.

11. The process according to claim 9, wherein the organopolysiloxane is hexamethyldisiloxane.

12. The process according to claim 9, wherein the organopolysiloxane is produced from hexamethyldisiloxane, and the fluorine-containing organic compound is pentafluorostyrene.

13. The process according to claim 9, wherein the porous substrate is porous polyprophylene.

14. The process according to claim 9, wherein the porous substrate is porous polypropylene, the organopolysiloxane is produced from hexamethyldisiloxane, and the fluorine-containing compound is pentafluorostyrene.

15. The process according to claim 9, wherein the inert gas is argon or helium.

16. The process according to claim 9, wherein the inert gas is argon.

17. The process according to claim 9, wherein the organopolysiloxane film is formed from plasma polymerization of an organosiloxane monomer or from a solution of an organopolysiloxane.

18. The process according to claim 9, wherein plasma is generated by a system selected from internal electrode system, external electrode system and electrodeless system.

19. The process according to claim 9, wherein the plasma treatment and the gaseous fluorine-containing organic compound treatment are repeated on said single film.

* * * * *